F. L. HENIG.
INLET OR CHECK VALVE.
APPLICATION FILED OCT. 25, 1918.
1,342,216.
Patented June 1, 1920.
2 SHEETS—SHEET 1.
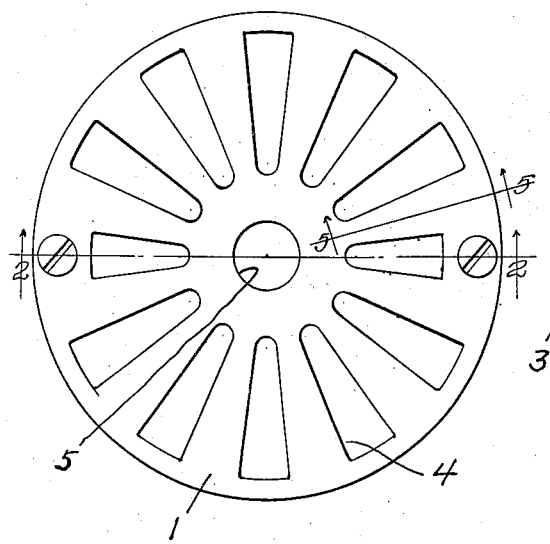
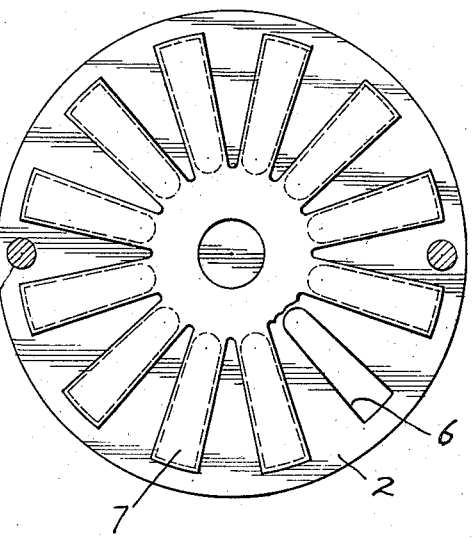
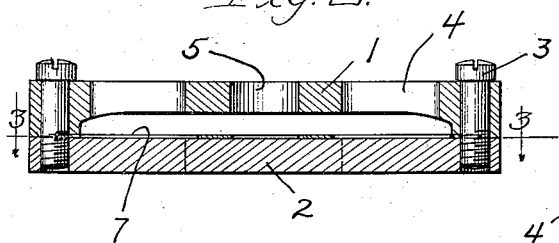
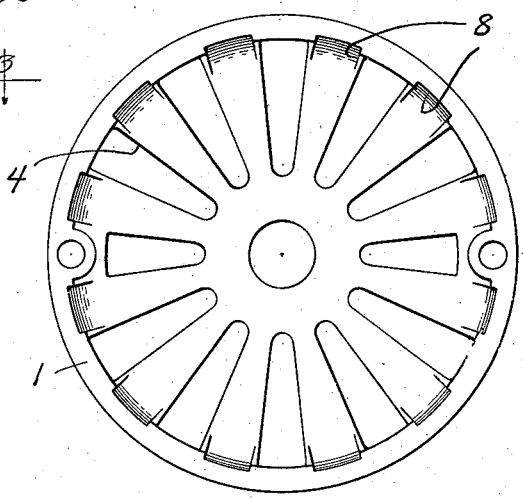
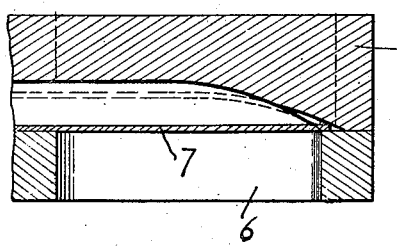
Witness:
R. L. Farrington
Inventor:
Frank L. Henig
by Albert Scheible,
Attorney

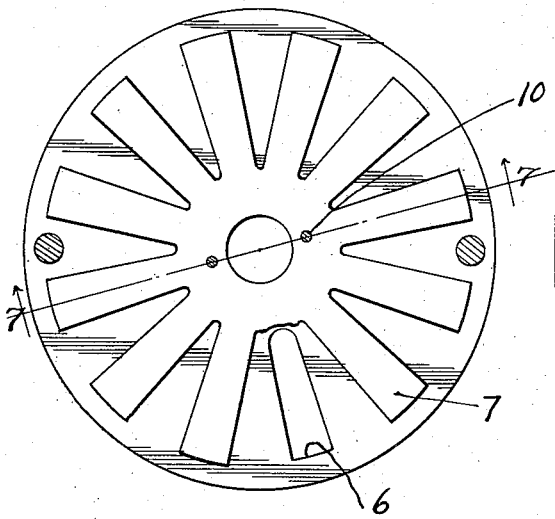
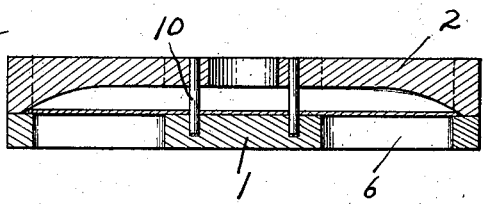
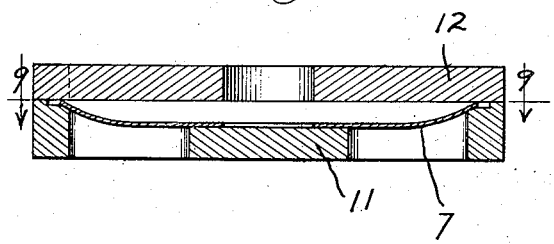
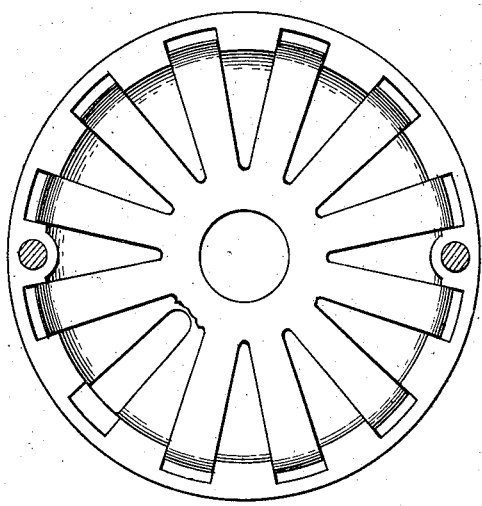
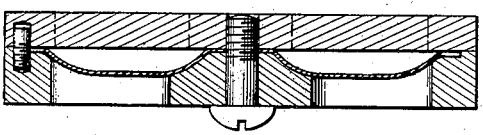

UNITED STATES PATENT OFFICE.

FRANK L. HENIG, OF CHICAGO, ILLINOIS, ASSIGNOR, BY MESNE ASSIGNMENTS, TO HENIG ENGINE CO., A CORPORATION OF ILLINOIS.

INLET OR CHECK VALVE.

1,342,216.  Specification of Letters Patent.  Patented June 1, 1920.

Application filed October 25, 1918. Serial No. 259,611.

*To all whom it may concern:*

Be it known that I, FRANK L. HENIG, citizen of the United States, residing at Chicago, in the county of Cook and State of Illinois, have invented certain new and useful Improvements in an Inlet or Check Valve; and I do hereby declare the following to be a full, clear, and exact description of the invention, such as will enable others skilled in the art to which it appertains to make and use the same.

My invention relates to fluid-operated inlet or check valves; that is to say, to valves designed for permitting the passage of fluid in one direction only and automatically operated by the pressure of the fluid or the corresponding negative pressure or suction. In general, my invention aims to provide a simple, compact, cheaply constructed and durable valve of this kind which will be adapted for quick and noiseless operation, which will have a very light movable valve portion and will therefore reduce the inertia of the movable valve member to a point where the momentum of the latter will be practically negligible as to its wear on the valve parts; which will afford a firm closure when the movable valve member is in one position, and which will afford ample openings when the movable valve member is in another position, thereby permitting a speedy passage of fluid through the valve; which will act simultaneously in closing a plurality of passages through the valve, thereby avoiding leakage and reducing the effective time of operation of the valve; which will cause the movable valve member automatically to adjust itself to irregularities in the seat against which this valve member impinges in its closure position; and which will require no attention or adjustment when in service. Furthermore, my invention aims to provide a valve which may be assembled as a unit and readily mounted as a unit in any duct through which fluid passes, which will occupy very little space longitudinally of such a duct, and which will permit the ready and inexpensive replacing of any and all of its parts. Moreover, my invention aims to provide a valve in which the movable member is not movable bodily in one direction, but has different portions arranged for moving in relatively transverse directions by a flexing of this member. My invention also aims to provide a valve member having portions adapted to be flexed by fluid pressure, and to provide means for preventing a vibration of the different portions and thereby avoiding the production of a corresponding sound. Still other objects will appear from the following specification and from the accompanying drawings in which—

Figure 1 is a plan view of a valve embodying my invention and including a flexible spider adapted to seat flatwise upon the bottom of the valve.

Fig. 2 is a central and transverse section through the valve, taken along the line 2—2 of Fig. 1.

Fig. 3 is a view of the valve with the cover removed.

Fig. 4 is a bottom view of the cover.

Fig. 5 is a fragmentary enlarged section taken along the line 5—5 of Fig. 1 and showing in dotted lines the position of the spider when partly flexed off its seat.

Fig. 6 is a view similar to Fig. 3, but showing guide pins arranged for preventing rotation of the spider within the valve casing.

Fig. 7 is a transverse section through the same valve.

Fig. 8 is a similar section through a valve in which the seat portion is concaved and in which the spider is flexed when in its closure position.

Fig. 9 is a horizontal section through Fig. 8 along the line 9—9.

Fig. 10 is a view of a valve in which the center portion of the spider is continuously clamped between the two parts of the valve casing, and in which only the legs of the spider are flexed.

Fig. 11 is a fragmentary detail showing another arrangement of guides for preventing rotation of the spider within the valve casing.

Generally speaking, the accompanying drawings show the purposes of my invention as accomplished by interposing a flexible metal spider between two parts of a valve casing, one part of which casing has apertures adapted to be closed by the arms of the spider when the latter is in one of the two extreme positions between which it is adapted to be moved by a flexure of its legs when pressure is exerted respectively in opposite directions. For example, in the valve of Figs. 1 to 5 inclusive, the casing consists of a cover 1 secured to a bottom 2 by screws 3, the cover having a number of apertures 4 extending radially of the same, and desirably also having a central aperture 5. The bottom 2 is likewise equipped with radial apertures 6, but these apertures are out of alinement with the apertures 5 in the cover.

Interposed between the two parts of the casing is a spider 7, made of a suitable sheet material, such as steel or bronze, the thickness of the material being such as to permit the legs of the spider to be flexed by upward pressure out of their normal flat disposition, as in Fig. 5, to a curvature corresponding more or less closely to the concave under surface of the cover 1. Each leg of the spider desirably alines with one of the perforations 6 of the bottom 2 and each leg projects in all directions beyond the edges of the adjacent perforation 6, as shown in Fig. 3, so that when the spider is seated as in Figs. 3 and 5, each leg will completely cover and close one of the apertures 6 in the bottom of the valve casing. To maintain the legs of the spider in proper relation to these apertures 6, I provide suitable means for preventing the spider from rotating with respect to the bottom 2. For example, the cover 1 may be provided with milled recesses 8 slidably housing tips of the legs of the spider, or the spider may be guided by pins 9 secured to the bottom 1 and laterally engaging one of the legs of the spider, as shown in Fig. 11. Or, a similar guiding effect may be obtained by pins 10 secured to the top 2 and slidably extending both through corresponding perforations in the hub of the spider and into bores in the bottom 1, as shown in Fig. 7.

In operation, it will be evident from Figs. 2 and 6 that with pressure exerted in a downward direction, the flexible spider will seat flatwise upon the top of the bottom plate 2, thus effectively closing all of the apertures 6. However, an upward pressure of fluid through the aperture 6 will raise the legs of the spider off their seat, and since the tips of these legs are continuously held in contact with the bottom plate, the result will be the arching of the spider into a concave section fitting or at least approaching the shape of the bottom of the cover 1. When the spider is thus flexed out of its seating position, the fluid passing upwardly through the aperture 6 will be free to pass also between the legs of the spider and through the cover openings 5 which are alined with the spaces between these legs. To further expedite the passage of the fluid beyond the spider, I may equip both the spider and the cover with central apertures, as shown in Figs. 1, 2 and 3, so that the fluid can pass through the central outlet 5 as well as through the spaces between the legs and thereafter through the apertures 4.

However, while I have illustrated and described the valve of my invention as embodied in a form in which the spider or flexionally movable valve member is normally flat when seated in its closure position, and in a form in which the entire spider is flexed during its movement from its closure to its open position, I do not wish to be limited to these or other details of the construction and arrangement here disclosed, it being obvious that the same might be varied in many ways without departing from the spirit of my invention. For example, I may construct my casing with a bottom 11 presenting a concave surface toward the cover 12, as in Fig. 8, in which case the spider 7 would be flexed into a correspondingly concaved form when seated in its closure position. Or, I may clamp the hub of the spider between the two portions of the valve casing, as in Fig. 10, so that the hub itself will remain stationary while the legs of the spider are flexed into and out of their closure positions.

In each case, it will be obvious that I can obtain both a closure and a quick opening while employing an exceedingly light movable member, or one which has very little momentum. Moreover, since the free ends of the legs of the spider are continuously guided between the two portions of the casing, so that these tips only slide back and forth during the flexing and unflexing of the legs, I secure a practically noiseless action. And, since the tips of the legs are not free to move longitudinally of the valve, I avoid their vibrating after the manner of a reed and thereby producing a musical note. So also, by using a single punching for the member having the legs which form the closure portions of my valve, I can insure a uniform action, which would not be possible with independently operating legs.

Since the spider does not move bodily, but only by a flexing which, even in the embodiments of Figs. 2 and 8, only moves the hub of the spider longitudinally of the casing while the tips of the legs move radially inward and outward in substantially a given plane, the momentum of the movable valve member is too slight to cause a hammering action. Consequently, the wear on the seating face will be practically negligible. However, each leg of the spider is free to adjust itself independently to irregularities in the seat or to wear on the latter. Moreover, by removing the clamping means, shown in Fig. 2 as screws 3, the spider can be quickly removed or replaced if it should be corroded or otherwise damaged. It will also be noted that with my valve construction an ample total area of openings can be obtained with a small movement of the spider parts longitudinally of the valve; consequently, my valve is adapted for the speedy operation which is so desirable in connection with the fluid passages of rotary engines, compressors, high speed suction pumps, blowers and the like.

Moreover, it will be obvious from the drawings that the valve of my invention can be constructed in extremely simple forms comprising only the two casing portions, the interposed flexible spider, and the means for clamping the casing parts to each other; that such a valve can readily be handled as a unit and inserted in any duct in which the passage of fluid is to be controlled in one direction, and that such a valve occupies very little space in a direction longitudinally of the duct, or vertically of Fig. 2. So also, it will be obvious that even in the embodiments of the drawings, the top 1 acts essentially as a stop for limiting the flexing of the spider and the movement of spider portions away from the passages otherwise closed by them, and I do not wish to be limited to the particular form of such stops implied by the covers of the embodiments pictured herewith.

I claim as my invention:

1. In a valve, a spider formed of a single piece of sheet material and having radial flexible arms, and a casing having guides for the extreme free ends of the arms and equipped with radial passages extending therethrough, the passages being so disposed as to be opened or closed by the flexing of the spider arms.

2. In a valve, a spider formed of a single piece of material and having radial flexible arms, and a casing formed with guides for engaging only the tips of the arms to allow the spider to be uniformly flexed in substantially the curvature of a part of a sphere.

3. A valve comprising a pair of body members contacting with each other at their peripheries and spaced from each other intermediate of their peripheries and each equipped with radial perforations leading to the space between said members, the perforations in one member being out of alinement with those of the other member; and a single flexible member disposed in the said space and having integral radial portions disposed for closing the perforations in one member, the body members being formed for slidably engaging the extreme free ends of the radial portions of the flexible member to permit the said portions of the latter to be moved out of their perforation-closing disposition only by a flexing of the flexible member.

4. A valve comprising a pair of body members contacting with each other at their peripheries and spaced from each other intermediate of their peripheries and each equipped with perforations leading to the space between said members, the perforations in one member being out of alinement with those of the other member; and a one-piece spider disposed in the said space and having arms the tips of which are radially slidable between the body members and respectively covering the perforations in the body member and adapted to be flexed out of their said perforation-covering disposition by fluid pressure exerted through the perforations adjacent to the arms.

5. In a valve, a spider having integral substantially radial arms of flexible sheet material, a body member having radial passages therethrough alining respectively with the spider arms, means for maintaining the tips of the spider arms substantially in a predetermined plane while permitting other portions of the spider to be flexed away from the said passages, and means for limiting the flexing of the spider.

6. In a valve, a spider having substantially radial arms of flexible sheet material, a body member having passages therethrough alining respectively with the spider arms, means for maintaining the tips of the spider arms substantially in a predetermined plane while permitting the arms of the spider to be flexed away from the said passages, and a stop for limiting the flexing of the spider, the said stop and the hub of the spider having alined perforations.

7. A valve as per claim 5, in combination with means for preventing the spider arms to be moved out of alinement with the said passages.

8. In a valve, a spider formed of a single piece of material and having radial flexible arms, and a casing formed with opposed parts to hold the hub in substantially parallel planes in both open and closed positions of the valve.

9. In a valve, a spider formed of a single piece of metal and having radial flexible arms, and means to mount the spider so as to movably support same only from the tips of the arms to thereby allow the spider to flex into a dome-like contour.

10. In a valve, a closure member comprising a spider having radial arms of relatively thin material adapted to be flexed into a substantially spherical segment by fluid pressure, and a mounting for the spider so arranged as to permit a bodily shifting movement of the hub of the spider along the axis of the latter while preventing the tips of the spider arms from moving other than radially of the said axis.

11. In a valve, a seat having a top equipped with perforations substantially concentric with respect to the axis of the valve, a flexible spider having arms extending radially of the said axis and respectively adapted to cover the said openings, and means slidably housing the outer ends of the arms to limit the movement of the arm tips to directions radial of the axis of the spider while permitting the spider to be flexed into a substantially spherical segment so as to move its hub away from the flat top to uncover the perforations in the seat.

12. In a valve, a body member having a plurality of radial apertures, a single flexible member having radial portions respectively adapted to cover all of the apertures and having interstices between the said portions for permitting the passage of fluid therebetween; and means for continuously maintaining the tips of the radial portions of the flexible member in contact with the body member while permitting other portions of the flexible member to be bodily shifted away from the said perforations by a flexing of the flexible member, in combination with means for preventing a relative lateral movement of the two members.

13. In a valve, a spider formed of a single piece of material and having radial flexible arms, and a casing formed to allow the spider to be uniformly flexed in substantially the curvature of a part of a sphere by a bodily shifting movement of its hub.

14. In a valve, a casing having a seat formed with radial passages, a valve formed of a single piece of material and having radial flexible arms for closing the respective passages and means to mount the valve to allow same to flex into the curvature of a substantially spherical segment by bodily shifting movement of its hub.

15. A valve comprising a seat having radial ports, a closure member having radial arms respectively adapted to close said ports, and a guard for limiting the movement of the closure member away from the seat by fluid pressure exerted through said ports, the closure member being completely free for bodily shifting movement of its hub between the other two members.

16. A valve comprising a seat equipped with radial ports, a guard having ports out of alinement with those in the seat, the guard and seat having their opposed faces formed for affording a chamber between the same, and a closure member of sheet material disposed in said chamber and having arms adapted to rest on the seat and respectively to close said radial ports, the guard being formed for limiting the opening movement of the closure member and for compelling a symmetrical flexing of the arms of the latter during such movement.

17. A valve casing having inlet ports radially disposed about the axis of the casing and leading to a chamber, and a closure member of sheet material disposed in the chamber and having arms respectively adapted to close said ports, the chamber being formed for compelling a flexing of the closure member to substantially a dome shape during its opening movement.

Signed at Chicago, Illinois, October 16th, 1918.

FRANK L. HENIG.